US012676649B2

(12) United States Patent
Gustavsson et al.

(10) Patent No.: US 12,676,649 B2
(45) Date of Patent: Jul. 7, 2026

(54) USER SELECTION FOR MU-MIMO

(71) Applicant: Telefonaktiebolaget LM Ericsson (publ), Stockholm (SE)

(72) Inventors: Ulf Gustavsson, Gothenburg (SE);
Amirashkan Farsaei, Eindhoven (NL);
Alex Alvarado, Den Bosch (NL);
Frans M.J. Willems, Geldrop (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 377 days.

(21) Appl. No.: 18/276,556

(22) PCT Filed: Feb. 16, 2021

(86) PCT No.: PCT/EP2021/053713
§ 371 (c)(1),
(2) Date: Aug. 9, 2023

(87) PCT Pub. No.: WO2022/174885
PCT Pub. Date: Aug. 25, 2022

(65) Prior Publication Data
US 2024/0137079 A1      Apr. 25, 2024

(51) Int. Cl.
*H04B 7/0452* (2017.01)
(52) U.S. Cl.
CPC ................................. *H04B 7/0452* (2013.01)
(58) Field of Classification Search
CPC ...................................................... H04B 7/0452
See application file for complete search history.

(56) References Cited

U.S. PATENT DOCUMENTS 10,251,139 B2      4/2019   Yang et al.
2018/0352523 A1*  12/2018   Yang ................... H04W 52/143
(Continued)

FOREIGN PATENT DOCUMENTS

WO      2021/197594 A1    10/2021
WO      2021/197595 A1    10/2021

OTHER PUBLICATIONS

International Search Report and Written Opinion issued in International Application No. PCT/EP2021/053713 dated Nov. 4, 2021 (15 pages).
(Continued)

*Primary Examiner* — Gary Mui
*Assistant Examiner* — Yewon Kim
(74) *Attorney, Agent, or Firm* — Rothwell, Figg, Ernst & Manbeck, P.C.

(57)      ABSTRACT

A method is disclosed of selecting users for multi user multiple-input multiple-output (MU-MIMO) communication from an initial set of potential users. The method comprises repeating the following steps in successive iterations until a stopping criterion is met: determining a channel correlation metric for each user in the set of potential users, reducing the set of potential users by exclusion of a user based on the channel correlation metric, and calculating a performance metric of the set of potential users. The method also comprises selecting users corresponding to one of the sets of potential users, wherein the selection is based on a comparison of the calculated performance metrics of the sets of potential users. The channel correlation metric for a user may comprise one or more of: a channel filter norm for the user, a channel norm for the user, a channel gain for the user, pair-wise correlations between the user and one or more other users of the set of potential users, and a channel eigenvalue for the user. The performance metric may com- (Continued)

prise one or more of: a sum-rate, a per-user-rate, an average error rate, a maximum error rate, a per-user error rate, and a sum-correlation. Corresponding apparatus, network node and computer program product are also disclosed.

20 Claims, 2 Drawing Sheets

(56) References Cited

U.S. PATENT DOCUMENTS

| | | | |
|---|---|---|---|
| 2021/0250067 A1* | 8/2021 | Mao | H04B 7/0452 |
| 2022/0279533 A1* | 9/2022 | Mao | H04B 7/0452 |
| 2024/0154653 A1* | 5/2024 | Gustavsson | G06N 3/04 |

OTHER PUBLICATIONS

Maciel, T. F., et al., "A convex quadratic SDMA grouping algorithm based on spatial correlation", IEEE, 2007 (6 pages).

Maciel, T. F., et al., "On the Performance, Complexity, and Fairness of Suboptimal Resource Allocation for Multiuser MIMO-OFDMA Systems", IEEE Transactions on Vehicular Technology, vol. 59, No. 1, Jan. 2010 (14 pages).

Guthy, C., et al., "Low-Complexity Linear Zero-Forcing for the MIMO Broadcast Channel", IEEE Journal of Selected Topics in Signal Processing, vol. 3, No. 6, Dec. 2009 (12 pages).

Ngo, H., et al., "Aspects of Favorable Propagation in Massive MIMO", IEEE, Sep. 17, 2020 (5 pages).

Windpassinger, C., "Detection and Precoding for Multiple Input Multiple Output Channels", Erlangen, 2004 (201 pages).

Arai, T., et al., "Correlation-based User Scheduling and Multi-planar Parallelogram Array for Massive Antenna Systems", IEEE, 2016 (6 pages).

Farsaei, A., et al., "An improved dropping algorithm for line-of-sight massive MIMO with max-min power control", TU/e Eindhoven University of Technology, IEEE Communications Letters, 23(6), 2019 (5 pages).

Farsael, A., et al., "An Improved Dropping Algorithm for Line-of-Sight Massive MIMO With Tomlinson-Harashima Precoding", IEEE Communications Letters, vol. 23, No. 11, Nov. 2019 (5 pages).

* cited by examiner

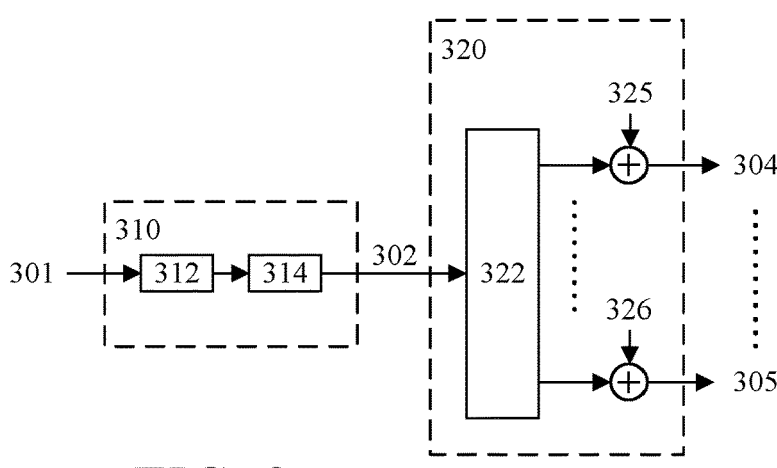
FIG. 3
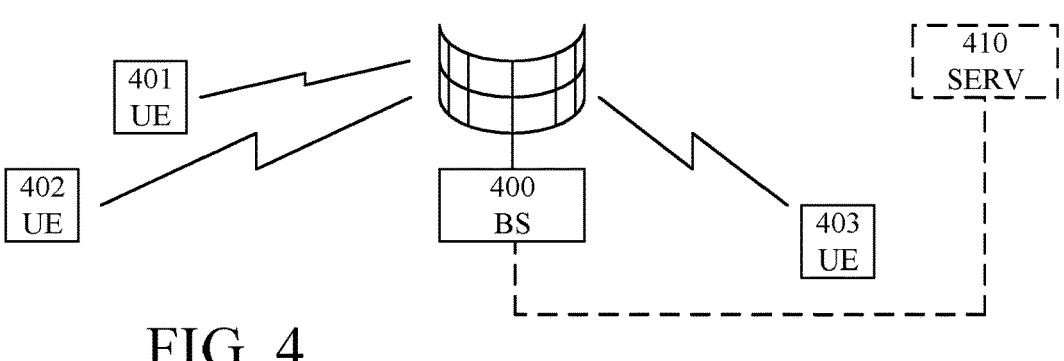
FIG. 4
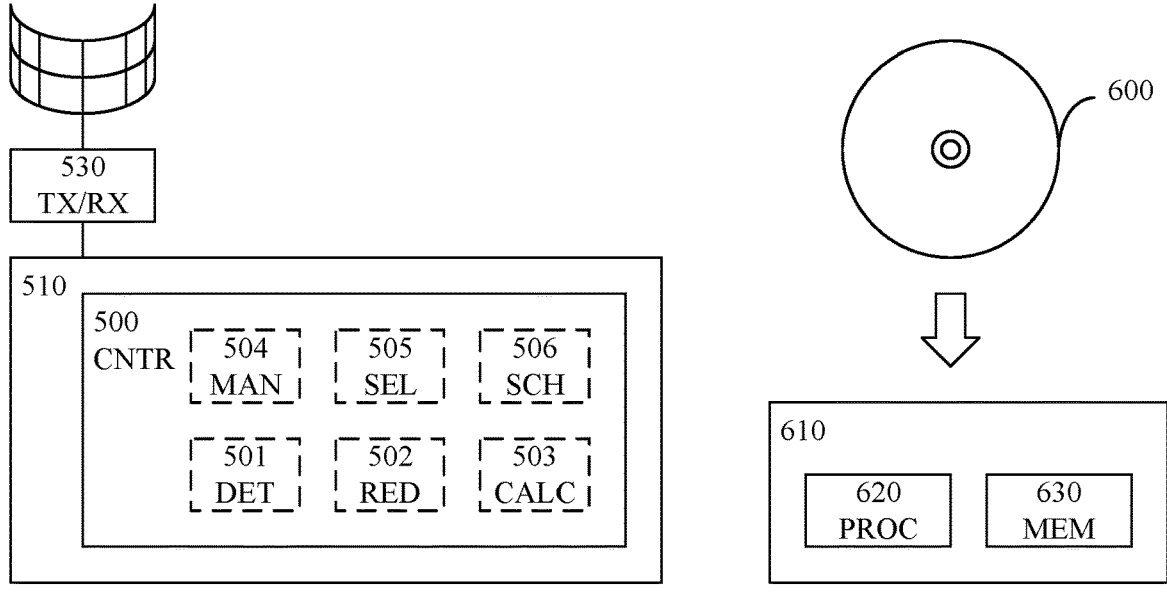
FIG. 5
FIG. 6

USER SELECTION FOR MU-MIMO

CROSS REFERENCE TO RELATED APPLICATIONS

This application is a 35 U.S.C. § 371 National Stage of International Patent Application No. PCT/EP2021/053713, filed 2021 Feb. 16.

TECHNICAL FIELD

The present disclosure relates generally to the field of wireless communication. More particularly, it relates to user selection for multi user multiple-input multiple-output (MU-MIMO) communication.

BACKGROUND

In some scenarios for MU-MIMO, there is a need to select which users from an initial set of potential users should be grouped together for MU-MIMO transmission (e.g., using a same time and/or frequency resource).

Examples include scenarios with a relatively large amount of potential users and/or scenarios where at least one potential user has relatively high channel correlation in relation to at least one other potential user (i.e., the corresponding users are referred to as highly correlated). For example, in line-of-sight (LoS) scenarios for MU massive MIMO with max-min power control, there are some use cases where the channel vectors of some users become highly correlated (i.e., the corresponding users are referred to as highly correlated).

A situation with highly correlated users typically leads to a relatively large detrimental effect on performance metric (s) (e.g., a relatable large reduction in the sum-rate for both linear and nonlinear precoders). To alleviate the detrimental effect on performance metric(s), one or more of the users can be dropped (and rescheduled).

To choose which users to drop (or—correspondingly—to choose which users to keep; i.e., to select users for MU-MIMO), an exhaustive search may be applied to find the optimal dropping strategy for the channel realization (e.g., in terms of performance metric(s)). The exhaustive search approach typically suffers from an extremely high computational complexity.

Alternatively, the spatial correlation among the channel vectors of users can be evaluated and one or more users with spatial correlation higher than a predefined threshold may be dropped. However, this approach typically yields results that are less than optimal (e.g., in terms of performance metric (s)), and the inferiority compared to the optimal dropping strategy may be undesirably large in some situations (e.g., for some practical massive MIMO systems and/or when the ratio between the number of antennas at the transmitter and the number of users is relatively low). Additionally, the process of finding suitable value(s) for the predefined threshold typically requires processing resources (e.g., for simulations and/or measurements).

Therefore, there is a need for alternative (and preferably improved) approaches for selecting users for multi user multiple-input multiple-output (MU-MIMO) communication from an initial set of potential users.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method of selecting users for multi user multiple-input multiple-output (MU-MIMO) communication from an initial set of potential users.

The method comprises repeating the following steps in successive iterations until a stopping criterion is met: determining a channel correlation metric for each user in the set of potential users, reducing the set of potential users by exclusion of a user based on the channel correlation metric, and calculating a performance metric of the set of potential users.

The method also comprises selecting users corresponding to one of the sets of potential users, wherein the selection is based on a comparison of the calculated performance metrics of the sets of potential users.

In some embodiments, the method further comprises calculating a performance metric of the initial set of potential users, wherein the comparison of the calculated performance metrics of the sets of potential users includes the performance metric of the initial set of potential users.

In some embodiments, the channel correlation metric for a user comprises one or more of: a channel filter norm for the user, a channel norm for the user, a channel gain for the user, pair-wise correlations between the user and one or more other users of the set of potential users, and a channel eigenvalue for the user.

In some embodiments, exclusion of a user based on the channel correlation metric comprises one or more of: excluding a user associated with the highest channel filter norm among the users in the set of potential users, excluding a user associated with the lowest channel norm among the users in the set of potential users, excluding a user associated with the lowest channel gain among the users in the set of users, excluding a user associated with the highest pair-wise correlation, and excluding a user associated with the lowest eigenvalue among the users in the set of potential users.

In some embodiments, the performance metric comprises one or more of: a sum-rate, a per-user-rate, an average error rate, a maximum error rate, a per-user error rate, and a sum-correlation.

In some embodiments, users are selected corresponding to the set of potential users among the sets of potential users that has one or more of: a highest sum-rate, a highest per-user-rate, a lowest average error rate, a lowest maximum error rate, a lowest per-user error rate, and a lowest sum-correlation.

In some embodiments, the stopping criterion comprises that a maximum number of iterations have been performed.

In some embodiments, a user corresponds to a single-antenna user device, a multi-antenna user device, or an antenna of a multi-antenna user device.

In some embodiments, the MU-MIMO applies max-min power control.

In some embodiments, the method comprises a first collection of successive iterations starting from the initial set of potential users and a second collection of successive iterations starting from the initial set of potential users, wherein a criterion for exclusion of a user differs in the first and second collections.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for selecting users for multi user multiple-input multiple-output (MU-MIMO) communication from an initial set of potential users. The apparatus comprises controlling circuitry.

The controlling circuitry is configured to cause—in successive iterations until a stopping criterion is met—determination of a channel correlation metric for each user in the set of potential users, reduction of the set of potential users by exclusion of a user based on the channel correlation metric, and calculation of a performance metric of the set of potential users.

The controlling circuitry is also configured to cause selection of users corresponding to one of the sets of potential users, wherein the selection is based on a comparison of the calculated performance metrics of the sets of potential users.

A fourth aspect is a network node comprising the apparatus of the third aspect.

In some embodiments, any of the above aspects may additionally have features identical with or corresponding to any of the various features as explained above for any of the other aspects.

An advantage of some embodiments is that alternative approaches are provided for selecting users for MU-MIMO communication from an initial set of potential users.

An advantage of some embodiments is that improved approaches are provided for selecting users for MU-MIMO communication from an initial set of potential users.

An advantage of some embodiments is that the computational complexity is reduced (e.g., compared to the exhaustive search approach).

An advantage of some embodiments is that the computational complexity can be controlled (e.g., by variation of applies parameter settings).

An advantage of some embodiments is that no processing resources are needed for finding suitable value(s) for a predefined threshold.

An advantage of some embodiments is that inferiority compared to the optimal dropping strategy (e.g., in terms of performance metric(s)) may be reduced (e.g., compared to approaches dropping user(s) with spatial correlation higher than a predefined threshold).

An advantage of some embodiments is that an outage probability may be reduced (e.g., compared to approaches which apply dropping user(s) with spatial correlation higher than a predefined threshold).

Generally, one or more of the above, or other, advantages may be achieved in a user equipment and/or in a network node, for example.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 3 is a schematic drawing illustrating an example channel model according to some embodiments;

FIG. 4 is a schematic drawing illustrating an example communication scenario according to some embodiments;

FIG. 5 is a schematic block diagram illustrating an example apparatus according to some embodiments; and FIG. 6 is a schematic drawing illustrating an example computer readable medium according to some embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described for selecting users for multi user multiple-input multiple-output (MU-MIMO) communication from an initial set of potential users.

Generally, when reference is made herein to selecting users (from an initial set of potential users) for MU-MIMO communication, it should be understood that this task can be equivalently expressed as selecting users to drop from the initial set of potential users.

Also generally, when MIMO is referred to herein, it should be understood to refer to any suitable MIMO approach (e.g., massive MIMO, or other MIMO schemes).

Some embodiments may be particularly suitable when the ratio between the number of antennas at the transmitter and the number of users is relatively low (e.g., lower than a ratio threshold value).

Figure 1:
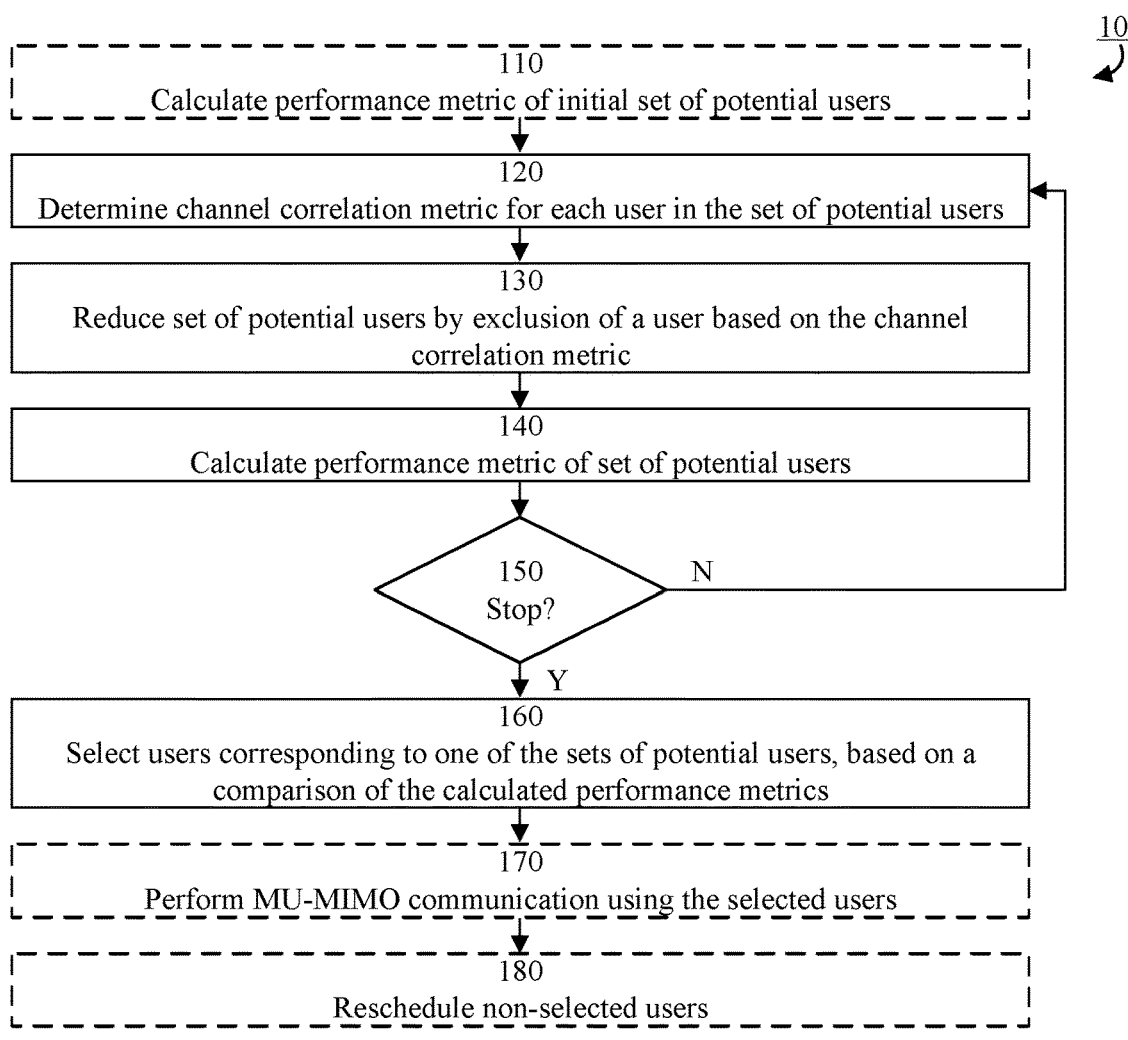
FIG. 1 is a flowchart illustrating example method steps according to some embodiments.

FIG. 1 illustrates an example method 100 according to some embodiments. The method is for selecting users for MU-MIMO communication from an initial set of potential users.

The MU-MIMO applies max-min power control according to some embodiments. It should be understood that, generally, other power control schemes may be applied instead; with corresponding adaptation of the algorithms as exemplified herein.

Also generally, when the term "algorithm" is used herein, it may be seen as a reference to a principle underlying execution of one or more method steps and/or defining one or more operations of an apparatus.

For example, the method 100 may be performed by a MU-MIMO transmitter device (e.g., a network node; such as a radio access node or a base station) or a device associated with a MU-MIMO transmitter (e.g., a network node; such as a server node).

In some embodiments, the method 100 is applied (only) when the ratio between the number of antennas at the transmitter and the number of users is relatively low (e.g., lower than a ratio threshold value).

In optional step 110, a performance metric of the initial set of potential users is calculated.

Generally, when a performance metric is referred to herein, it is meant to include any suitable performance metric (or combination of performance metrics). Typically, the performance metric may be based on the channel (e.g., the physical channel only, or a transfer channel including the physical channel as well as influence from one or more components—e.g., channel filters—at the transmitter and/or receiver) and/or on the transmission power (e.g., a maximum transmission power, or an instantaneous transmission power). Example performance metrics include a sum-rate, a per-user-rate, an average error rate, a maximum error rate, a per-user error rate, and a sum-correlation. Example error rates include a bit error rate, a block error rate, and a packet error rate.

In step 120, a channel correlation metric is determined for each user in the set of potential users.

Generally, when channel correlation is referred to herein, the correlation may be for the physical (over-the-air) channel only, or for a transfer channel including the physical channel as well as influence from one or more components (e.g., channel filters) at the transmitter and/or receiver.

Also generally, when a channel correlation metric is referred to herein, it is meant to include any suitable channel correlation metric (or combination of channel correlation metrics).

Example channel correlation metrics for a user include a channel filter norm for the user, a channel norm for the user, a channel gain for the user, pair-wise (absolute or complex valued) correlations between the user and one or more other users of the set of potential users, and a channel eigenvalue for the user.

Example channel filters include zero-forcing (ZF) filters, conjugate beamforming (CB) filters, minimum mean square error (MMSE) filters, and Tomlinson-Harashima Precoding (THP) filters.

In some embodiments, the method additionally comprises a step of determining channel filters.

Also generally, the channel correlation metric may be determined based on a channel estimation provided according to any suitable approach.

Also generally, the channel correlation metric may be seen as a metric for spatial correlation between users.

In step 130, the set of potential users is reduced by exclusion of a user based on the channel correlation metric. The reduction of the set of potential users may, for example, be implemented through deletion of a row of a channel matrix; which row represents the excluded user.

For example, step 130 may comprise excluding a user associated with the highest channel filter norm among the users in the set of potential users, excluding a user associated with the lowest channel norm among the users in the set of potential users, excluding a user associated with the lowest channel gain among the users in the set of users, excluding a user associated with the highest pair-wise correlation, and excluding a user associated with the lowest eigenvalue among the users in the set of potential users. In some embodiments, step 130 may comprise excluding a user associated with a combination of one or more of: a channel filter norm for the user, a channel norm for the user, a channel gain for the user, pair-wise correlations between the user and one or more other users of the set of potential users, and a channel eigenvalue for the user; which combination fulfills an exclusion criterion (e.g., excluding a user associated with the highest pair-wise correlation among the users of the set of potential users that are associated with an eigenvalue below an eigenvalue threshold).

In step 140, a performance metric of the (now reduced) set of potential users is calculated.

As mentioned above, the performance metric may be any suitable performance metric (or combination of performance metrics). Typically, the performance metric may be based on the channel (e.g., the physical channel only, or a transfer channel including the physical channel as well as influence from one or more components—e.g., channel filters—at the transmitter and/or receiver) and/or on the transmission power (e.g., a maximum transmission power, or an instantaneous transmission power). Example performance metrics include a sum-rate, a per-user-rate, an average error rate, a maximum error rate, a per-user error rate, and a sum-correlation. Example error rates include a bit error rate, a block error rate, and a packet error rate.

Typically, the performance metric calculated in step 140 for the reduced set of potential users may be the same type of performance metric as the one calculated for the initial set of potential users in optional step 110.

Steps 120, 130, and 140 are repeated in successive iterations until a stopping criterion is met.

For each iteration, the set of potential users is successively reduced by one user in step 130 based on the channel correlation metric of step 120, and a corresponding performance metric is calculated in step 140.

The stopping criterion may be any suitable criterion. For example, the stopping criterion may be met when a maximum number of iterations have been performed, or when a maximum number of users have been excluded, or when the set of potential users have been reduced to a minimum size. Alternatively or additionally, the stopping criterion may be met when the calculated performance metric of at least one of the sets of potential users meets a performance metric criterion. Example performance metric criteria include a sum-rate exceeding a sum-rate threshold, a per-user-rate exceeding a per-user-rate threshold, an average/maximum/ per-user error rate not exceeding an error rate threshold, and a sum-correlation not exceeding a sum-correlation threshold.

In step 150, it is determined whether the stopping criterion is met. If the stopping criterion is not met (N-path out of step 150), the method returns to step 120 for another iteration. If the stopping criterion is met (Y-path out of step 150), the method proceeds to step 160.

In step 160, users are selected (for MU-MIMO communication). The selection corresponds to one of the sets of potential users; the reduced set of potential users from one of the iterations or, possibly, the initial set of potential users. Thus, step 160 may be seen as selecting one of the sets of potential users, and defining the users of the selected set as users selected for MU-MIMO communication (i.e., allowing, or letting, the users of the selected set be selected for MU-MIMO communication).

The selection of users of step 160 is based on a comparison of the calculated performance metrics of the sets of potential users. In various embodiments, the comparison may include all, or only some, of the calculated performance metrics. For example, the comparison may, or may not, include the performance metric of the initial set of potential users.

For example, the selection of users of step 160 may comprise selecting users corresponding to the set of potential users that has a highest sum-rate, a highest per-user-rate, a lowest average error rate, a lowest maximum error rate, a lowest per-user error rate, a lowest sum-correlation, or any combination thereof.

In optional step 170, MU-MIMO communication is performed using the selected users.

In optional step 180, non-selected (dropped) users are rescheduled (e.g., for communication using one or more other communication resources).

It should be noted that, according to some embodiments, optional steps 170 and 180 may be performed in another order than the one illustrated in FIG. 1, and/or partly in parallel.

Generally, a user may correspond to a single-antenna user device, a multi-antenna user device, or an antenna of a multi-antenna user device. In the latter case, various approaches are possible. In some approaches, the reduction of the set of potential users (compare with step 130) may include a restriction condition specifying that when one antenna of a multi-antenna user device is excluded, all other antennas of that multi-antenna user device are also excluded. In some approaches, there is no such restriction condition and it is possible to exclude some antenna(s) of a multi-antenna user device while not excluding other antenna(s) of that multi-antenna user device. Excluded antenna(s) of a multi-antenna user device may, for example, be used for diversity reception and/or for achieving beamforming gain.

Figure 2:
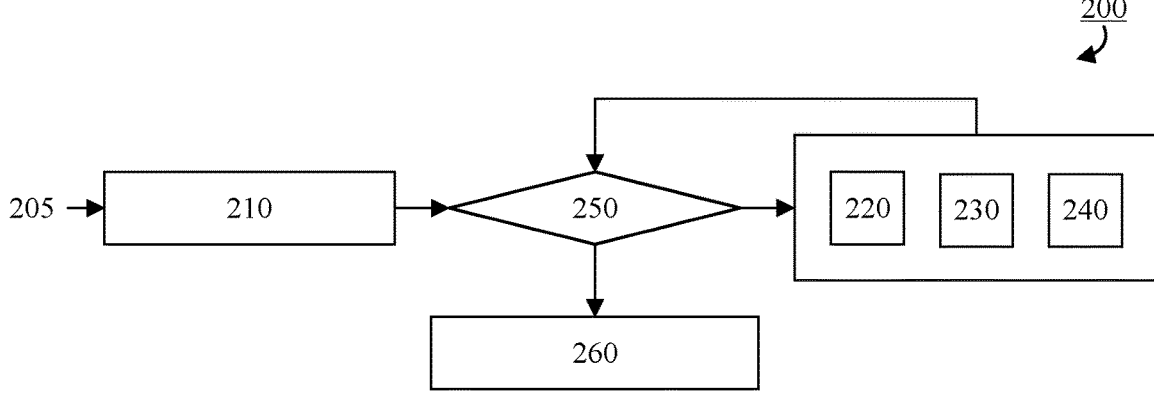
FIG. 2 is a flowchart illustrating example method steps according to some embodiments.

FIG. 2 illustrates an example method 200 according to some embodiments. The method is for selecting users for MU-MIMO communication from an initial set of potential users, and may be seen as a variant (or an exemplification) of the example method 100 of FIG. 1. It should be noted that features mentioned in connection to FIG. 1 may be equally applicable to the method 200 even if not explicitly mentioned in connection to FIG. 2.

In step 210, a performance metric (e.g., a sum-rate) of the initial set of potential users is calculated (compare with step 100 of FIG. 1) based on input information 205. Step 210 may also comprise setting an iteration counter to an initial value (e.g., zero).

Typical input information may comprise one or more of: channel information (e.g., a channel matrix) for the initial set of potential users, a transmission power value, and a stopping criterion parameter (e.g., a maximum number of iterations).

In step 250 (compare with step 150 of FIG. 1), it is determined whether the stopping criterion is met (e.g., whether the iteration counter has reached the maximum number of iterations). If the stopping criterion is not met, the method proceeds to the steps of the first iteration. If the stopping criterion is met, the method proceeds to step 260.

Each iteration comprises steps 220, 230, and 240.

In step 220, a channel correlation metric (e.g., a channel filter norm) is determined for each user in the set of potential users (compare with step 120 of FIG. 1).

In step 230, the set of potential users is reduced by exclusion of a user based on the channel correlation metric (compare with step 130 of FIG. 1); e.g., excluding a user associated with the highest channel filter norm among the users in the set of potential users.

In step 240, a performance metric (e.g., a sum-rate) of the set of potential users is calculated (compare with step 140 of FIG. 1).

Each iteration may also comprise incrementing the iteration counter (e.g., increasing it by one).

At the end of each iteration, the method returns to step 250 to determine whether the stopping criterion is met as explained above.

In step 260, users are selected for MU-MIMO communication (compare with step 160 of FIG. 1); e.g., users may be selected as corresponding to the set of potential users that has a highest sum-rate.

In an illustrative example, the proposed selection method (also referred to herein as the proposed dropping algorithm) aims at finding the set of users for MU-MIMO communication (or, correspondingly, finding the set of users that shall be dropped) such that the sum-rate with max-min power control is maximized given that $n_{max}$ is the maximum number of users that are allowed to be dropped.

This illustrative example will now be described with reference to FIG. 2. It should be understood that any details of this example may be equally applicable to other embodiments, as suitable.

The example assumes that the MU-MIMO transmitter is a base station (BS) with M antennas that serves K single-antenna users.

The inputs 205 of the algorithm are: $n_{max}$, the channel matrix H, and the transmit power P of the transmitter. After running the proposed dropping algorithm, the set of active users $\mathcal{A}^*$ is found.

The channel matrix may be achieved in any suitable way (e.g., provided by a channel estimator).

The transmit power may be any suitable transmit power value (e.g., an instantaneous transmit power to be used for the MU-MIMO communication, or a maximum possible transmit power).

The maximum number of users that are allowed to be dropped may, for example, be based on one or more of: the number of transmit antennas M, the number of potential users K, and a complexity value. For example, the maximum number of users that are allowed to be dropped may increase with increased number of transmit antennas, and/or increase with increased the number of potential users, and/or increase with increased acceptable complexity.

In this illustrative example, the zero-forcing (ZF) filters for the channel with K users and the corresponding achievable sum-rate R(i) are found in step 210, where i=0, before starting the iteration loop 220, 230, 240 of the proposed algorithm.

At each iteration i, 220, 230, 240, the user with the highest filter norm is excluded (prospectively dropped), the channel matrix is updated by removing row corresponding to the excluded user, the reduced set of users (excluding i+1 users) is found, as well as the corresponding sum-rate R(i+1).

At the end of iterations 260, the maximum sum-rate among the sum-rates of the different iterations is found, and the corresponding set of potential users is selected.

Thus, step 210 may be seen as an initialization step. The sum-rate for each iteration is set to zero and stored in a variable R (e.g., a vector of ($n_{max}$+1) elements). The set of users for i=0 is denoted $\mathcal{A}^0 = \{1, 2, \ldots, K\}$, which corresponds to the case where no users are excluded. The channel matrix for i=0 is $H^0=H$. The ZF achievable downlink sum-rate $R(0)$ with max-min power control is found as $$R(0) = \log_2\left(1 + \frac{P}{N_0 \sum_{k=1}^{K} \|g_k\|^2}\right),$$

where $N_0$ represents the AWGN power at the users' receivers, and $g_k$, k=1, 2, . . . , K, denotes ZF filters, $G=(g_1, \ldots, g_K)=(H^0)^\dagger$, wherein $H^\dagger=H^H (HH^H)^{-1}$ for a channel matrix $H \in \mathcal{C}^{K \times M}$.

In step 220 of each iteration loop, the ZF filters $g_k$, k=1, 2, . . . , K–i are found by finding the pseudo-inverse of the channel matrix $H^i$, $G=(H^i)^\dagger$, and the filter norms $\|g_k\|$ are used as channel correlation metrics.

In step 230 of each iteration loop, the user with the highest filter $\|g_j\|$ is found $$j = \operatorname*{argmax}_{k \in \mathcal{A}^i} \|g_k\|,$$

and excluded by removing row j from the channel matrix $H^i$ to find $H^{i+1}$. The set of active users $\mathcal{A}^{i+1}$ is found by removing user j from $\mathcal{A}^i$, $\mathcal{A}^{i+1} \leftarrow \mathcal{A}^i \setminus \{j\}$, and the corresponding information is stored.

In step 240 of each iteration loop, the sum-rate corresponding the set $\mathcal{A}^{i+1}$ is found as $$R(i+1) = \log_2\left(1 + \frac{P}{N_0 \sum_{k \in \mathcal{A}^{i+1}} \|g_k\|^2}\right),$$

the iteration counter i is increased by 1, and the corresponding entry $R(i+1)$ of the variable R is updated.

The iteration continues until i reaches $n_{max}$, which is controlled via step 250; $i < n_{max}$ meaning that the stopping criterion is not met.

When i reaches $n_{max}$, step 260 is performed, where the index n* of the iteration with the highest sum-rate, $$n^* = \operatorname*{argmax}_{i=0 \ldots n_{max}} R(i)$$

and the corresponding set of users $\mathcal{A}^* = \mathcal{A}^{n^*} \subseteq \{1, 2, \ldots, K\}$ are found; providing the output of the proposed algorithm.

FIG. 3 schematically illustrates an example channel model according to some embodiments, e.g., representing a model for a downlink channel with linear precoding for an M-antenna BS that serves K single-antenna users.

The linear precoding 310 comprises that the zero-mean, uncorrelated, and unit variance symbols $s=(s_1, s_2, \ldots, s_K)^T \in \mathcal{C}^{K \times 1}$ provided at 301 are precoded by a diagonal power control matrix $D=\operatorname{diag}(d)$ represented by 312 and a linear precoding matrix $U \in \mathcal{C}^{M \times K}$ with unit-norm column vectors $u_i$ represented by 314.

The power control vector is $d=(\sqrt{d_1}, \sqrt{d_2}, \ldots, \sqrt{d_K})^T$, where $d_k \in R^+$ with k=1, 2, . . . , K are power control coefficients. The radiated power constraint at the BS is $$\sum_{k=1}^{K} d_k = P.$$

The precoded vector $x \in \mathcal{C}^{M \times 1}$ provided at 302 is found as $x=UDs$.

The precoded vector 302 is transmitted through the downlink channel 320; comprising the matrix $H=(h_1, h_2, \ldots, h_K)^T \in \mathcal{C}^{K \times M}$ represented by 322, where $h_k$ is the channel vector from the BS antennas to user k. The received signal for user k is represented at 304-305 and may be expressed as $$y_k = h_k^T x + n_k = h_k^T u_k \sqrt{d_k} s_k + \sum_{j \neq k} h_k^T u_j \sqrt{d_j} s_j + n_k,$$

where $n_k$ 325-326 is complex AWGN noise with variance $N_0$.

Assuming a perfect channel state information for a given channel realization, the signal-to-interference-plus-noise ratio (SINR) for each user can be expressed as:

$$\gamma_k = \frac{|h_k^T u_k|^2 d_k}{\sum_{j \neq k} |h_k^T u_j|^2 d_j + N_0}.$$

For a given set of filters $u_k$, k=1, 2, . . . , K, it may be beneficial to find the coefficients $d_k$, k=1, 2, . . . , K that maximize the minimum $\gamma_k$ among the users (a.k.a., max-min power control), i.e., to find $$d = \operatorname*{argmax}_{d_1, d_2, \ldots, d_K} \min_k \gamma_k.$$

Using max-min power control, uniformly good service may be achieved for all users involved.

For ZF, U is found by modifying the pseudo-inverse of the channel; the ZF filters $u_k$ are found by normalizing the kth column of the pseudo-inverse of the channel $H^\dagger = (g_1, g_2, \ldots, g_K) = H^H (HH^H)^{-1}$ to have a unit-norm column vector, $$u_k = \frac{g_k}{\|g_k\|}.$$

Using the ZF filters, the max-min power control coefficients d are found, which leads to a per-user SINR of $$\gamma = \frac{P}{N_0 \sum_{k=1}^{K} \|g_k\|^2}.$$

Generally, the use of ZF filters $(g_1, g_2, \ldots, g_K)=H^H (HH^H)^{-1}$ may be replaced by use of any other suitable filters; e.g., conjugate beamforming (CB) filters $(g_1, g_2, \ldots, g_K)=H^H$, minimum mean square error (MMSE) filters $(g_1, g_2, \ldots, g_K)=H^H (\alpha I + HH^H)^{-1}$ where $\alpha$ is an MMSE scaling factor, and Tomlinson-Harashima Precoding (THP) filters.

Alternatively or additionally, the use of highest filter norm $\|g_j\|$ for exclusion may be replaced by use of any other suitable channel correlation metric; e.g., highest sum-correlation $\Sigma_{\rho ij}$ (particularly suitable for CB filters), lowest channel gain $\|h_j\|$, highest pair-wise correlations $$\rho_{jk} = \frac{h_k^H h_j}{\|h_k\|\|h_j\|} \text{ or } |\rho_{jk}|,$$

or lowest channel eigenvalue.

When the proposed approach is applied for THP, two rounds of iterations (compare with steps 210, {220, 203, 240}) may be executed before selecting the set of users that results in the maximum sum-rate (compare with step 260). In the first round, the algorithm may be executed as described above. In the second round, the algorithm may be executed similarly, with the exception that—for the first iteration of the second round—the user with the second highest filter norm is excluded instead of the user with the highest filter norm. This exemplifies embodiments with a first collection of successive iterations starting from the initial set of potential users and a second collection of successive iterations starting from the initial set of potential users, wherein a criterion for exclusion of a user differs in the first and second collections.

By employing THP filters with max-min power control, the SINR at the users may be improved compared to the use of ZF filters.

THP uses LQ-decomposition of the channel and the modulo operator to remove multi-user interference. The LQ-decomposition of a channel matrix may be expressed as $H=LQ$, where L is a lower triangular matrix of size K×M, and Q is an M×M unitary matrix ($QQ^H=Q^HQ=I_M$). According to THP, the symbols s are encoded to s̃ as:

$$\tilde{s}_k = \left[s_k - \sum_{j=1}^{k-1} b_{kj}\tilde{s}_j\right]_\Delta, \; k = 1, \dots K$$

where $[.]_\Delta$ is the modulo operator with divisor $\Delta$ and $b_{kj}$ is element (i,j) of a lower triangular matrix B, found by scaling the matrix L as B=LG, where G is a diagonal matrix, which renders the diagonal elements of B to be equal to 1. A vector x̃ is generated by precoding s̃ with a filter matrix $W=Q^HG$. Then, x̃ is adjusted by a scalar $\beta$ to meet the power constraint $\|x\|^2=P_{tot}$ at the transmitter. The vector $x=\beta\tilde{x}$ is transmitted through the channel.

To conclude the description of FIGS. 1 and 2, an iterative dropping algorithm is provided which does not require a predefined threshold for the spatial correlation of the channel vectors, while achieving near-optimal performance. At each iteration of the proposed algorithm, a user is excluded (i.e., prospectively dropped); for example, the user with the highest filter norm. The maximum number of users allowed to be dropped (and rescheduled), may be set in advance. By comparing a performance metric (e.g., the sum-rate) for the set of potential users of each iteration, a suitable (e.g., the "best" in terms of the performance metric) set of users for MU-MIMO communication is found.

Compared to other sub-optimal selection approaches (e.g., correlation-based solutions), the proposed solution typically achieves better performance (e.g., lower outage probability), and does not require a predefined threshold for the spatial correlation. Furthermore, the complexity of the proposed solution can be controlled (e.g., by varying one or more parameter values, such as the maximum number of users to be dropped).

Compared to the optimal selection approach (exhaustive search), the complexity is reduced considerably by application of the proposed solution.

The complexity order of finding ZF filters is the same for all examined approaches; i.e., $O(MK^2)$.

To find the SINR for ZF at each iteration it is only required to find $\Sigma_k\|g_k\|^2=\text{trace}[(HH^H)^{-1}]$. Complexity-wise, this is equal to finding the diagonal elements of a matrix of size (K–i)×(K–i), which has a complexity order of $O((K-i)^3)$. If $n_{max}$ is small enough compared to K, the complexity order of this part of the proposed algorithm is $O(K^3)$.

For the exhaustive search approach, there are $$\binom{K}{n}$$

cases that must be checked for each number n of users to be dropped, which has a complexity order of $O(K^3)$. Thus, the complexity order of this part of the exhaustive search approach is $O(K^{n_{max}+3})$.

FIG. 4 schematically illustrates an example communication scenario according to some embodiments. In the example scenario, a base station (BS) 400 serves three user equipments (UE) 401, 402, 403. As elaborated on above, a user device, such as a UE, may be a single-antenna user device (handled as a user) or may be a multi-antenna user device (wherein each antenna is handled as a user or the device is handled as a single user).

Possibly, the base station is operatively connected to (or otherwise associated with) a server (SERV) 410. The server may, for example, be a central node of the wireless communication network that the base station 400 belongs to, or may be a server external to the wireless communication network (e.g., an Internet server or a cloud server).

The base station 400 and/or the server 410 may comprise an apparatus configured to cause execution of (e.g., configured to execute) one or more of the method steps described in connection with any of FIGS. 1 and 2, to select users of the UEs 401, 402, 403 for MU-MIMO communication.

FIG. 5 schematically illustrates an example apparatus 510 according to some embodiments. The apparatus is for selecting users for MU-MIMO communication from an initial set of potential users.

For example, the apparatus 510 may be comprised, or comprisable, in a MU-MIMO transmitter device (e.g., a network node; such as a radio access node or a base station—compare with 400 of FIG. 4) or a device associated with a MU-MIMO transmitter (e.g., a network node; such as a server node—compare with 410 of FIG. 4).

In some embodiments, the apparatus may be configured to cause execution of (e.g., configured to execute) one or more of the method steps described in connection with any of FIGS. 1 and 2.

It should be noted that features mentioned in connection to any of FIGS. 1, 2, and 4 may be equally applicable (mutatis mutandis) to the apparatus 510 even if not explicitly mentioned in connection to FIG. 5.

The apparatus 510 comprises a controller (CNTR; e.g., controlling circuitry or a control module) 500.

The controller 500 is configured to cause determination of a channel correlation metric for each user in the set of potential users (compare with step 120 of FIG. 1). To this end, the controller 500 may comprise, or be otherwise associated with (e.g., connected, or connectable, to) a channel correlation metric determiner (DET; e.g., determining circuitry or a determination module) 501. The determiner may be configured to determine the channel correlation metric for each user in the set of potential users.

The controller 500 is also configured to cause reduction of the set of potential users by exclusion of a user based on the channel correlation metric (compare with step 130 of FIG. 1). To this end, the controller 500 may comprise, or be otherwise associated with (e.g., connected, or connectable, to) a reducer (RED; e.g., reducing circuitry or a reduction module) 502. The reducer may be configured to reduce the set of potential users by exclusion of a user based on channel correlation metric.

The controller 500 is also configured to cause calculation of a performance metric of the set of potential users (compare with steps 110 and 140 of FIG. 1). To this end, the controller 500 may comprise, or be otherwise associated with (e.g., connected, or connectable, to) a performance metric calculator (CALC; e.g., calculating circuitry or a calculation module) 503. The calculator may be configured to calculate the performance metric of the set of potential users.

The controller 500 is configured to cause successive iterations of determination, reduction, and calculation until a stopping criterion is met; and stopping of the iterations when the stopping criterion is met (compare with step 150 of FIG. 1). To this end, the controller 500 may comprise, or be otherwise associated with (e.g., connected, or connectable, to) an iteration manager (MAN; e.g., managing circuitry or a management module) 504. The manager may be configured to determine—for each iteration—whether the stopping criterion is met, and stop the successive iterations when the stopping criterion is met.

The controller 500 is also configured to cause selection of users corresponding to one of the sets of potential users, wherein the selection is based on a comparison of the calculated performance metrics of the sets of potential users (compare with step 160 of FIG. 1). To this end, the controller 500 may comprise, or be otherwise associated with (e.g., connected, or connectable, to) a user selector (SEL; e.g., selecting circuitry or a selection module) 505. The selector may be configured to select users corresponding to one of the sets of potential users based on a comparison of the calculated performance metrics.

The controller 500 may be further configured to cause performance of MU-MIMO communication (compare with step 170 of FIG. 1). To this end, the controller 500 may comprise, or be otherwise associated with (e.g., connected, or connectable, to) a transceiver (TX/RX; e.g., transceiving circuitry or a transceiver module) 530. The transceiver may be configured to perform the MU-MIMO communication.

The controller 500 may be further configured to cause rescheduling of non-selected users (compare with step 180 of FIG. 1). To this end, the controller 500 may comprise, or be otherwise associated with (e.g., connected, or connectable, to) a scheduler (SCH; e.g., scheduling circuitry or a scheduler module) 506. The scheduler may be configured to reschedule non-selected users.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

According to some embodiments, a computer program product comprises a tangible, or non-tangible, computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC; e.g., data processing circuitry or a data processing unit) 620, which may, for example, be comprised in a wireless communication device or a network node 610. When loaded into the data processor, the computer program may be stored in a memory (MEM) 630 associated with or comprised in the data processor. According to some embodiments, the computer program may, when loaded into and run by the data processor, cause execution of method steps according to, for example, any of the methods illustrated in FIGS. 1 and 2, or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of selecting users for multi user multiple-input multiple-output (MU-MIMO) communication, the method comprising:

determining a first channel correlation metric for each user in a first set of potential users;

reducing the first set of potential users by exclusion of a user based on the determined channel correlation metrics, thereby producing a second set of potential users, which is a subset of the first set of potential users;

calculating a performance metric for the second set of potential users; and selecting users for the MU-MIMO communication based on the calculated performance metric for the second set of potential users.

2. The method of claim 1, wherein the method further comprises calculating a performance metric for the first set of potential users, and selecting users for the MU-MIMO communication based on the calculated performance for the second set of potential users comprises selecting users for the MU-MIMO communication based on: i) the calculated performance for the first set of potential users and ii) the calculated performance for the second set of potential users.

3. The method of claim 1, wherein the first channel correlation metric for a user comprises:

a channel filter norm for the user;

a channel norm for the user;

a channel gain;

pair-wise correlations between the user and one or more other users of the first set of potential users; and/or a channel eigenvalue for the user.

4. The method of claim 1, wherein exclusion of a user based on the determined channel correlation metrics comprises:

excluding a user associated with the highest channel filter norm among the users in the first set of potential users;

excluding a user associated with the lowest channel norm among the users in the first set of potential users;

excluding a user associated with the lowest channel gain among the users in the first set of potential users;

excluding a user associated with the highest pair-wise correlation among the users in the first set of potential users; and/or excluding a user associated with the lowest eigenvalue among the users in the first set of potential users.

5. The method of claim 1, wherein the performance metric for the second set of potential users comprises: a sum-rate, a per-user-rate, an average error rate, a maximum error rate, a per-user error rate, and/or a sum-correlation.

6. The method of claim 1, wherein users are selected for the MU-MIMO communication based on: a highest sum-rate, a highest per-user-rate, a lowest average error rate, a lowest maximum error rate, a lowest per-user error rate, and/or a lowest sum-correlation.

7. The method of claim 1, wherein the method is repeated in successive iterations until a stopping criterion is met; and the stopping criterion comprises that a maximum number of iterations have been performed.

8. The method of claim 1, wherein a user corresponds to a single-antenna user device, a multi-antenna user device, or an antenna of a multi-antenna user device.

9. The method of claim 1, wherein the MU-MIMO applies max-min power control.

10. The method of claim 1, wherein the method comprises a first collection of successive iterations of the method starting from the first set of potential users and a second collection of successive iterations of the method starting from the first set of potential users, wherein a criterion for exclusion of a user differs in the first and second collections.

11. A computer program product comprising a non-transitory computer readable medium, having thereon a computer program comprising program instructions, the computer program being loadable into a data processing unit and configured to cause execution of the method of claim 1 when the computer program is run by the data processing unit.

12. The method of claim 1, wherein exclusion of a user based on the determined channel correlation metrics comprises:

excluding a user associated with the highest channel filter norm among the users in the first set of potential users;

excluding a user associated with the lowest channel norm among the users in the first set of potential users;

excluding a user associated with the lowest channel gain among the users in the first set of potential users; and/or excluding a user associated with the highest pair-wise correlation among the users in the first set of potential users.

13. The method of claim 1, wherein the method further comprises calculating a performance metric for the first set of potential users, selecting the users for the MU-MIMO communication based on the calculated performance metric for the second set of potential users comprises selecting a set of users from a plurality of sets of users, the plurality of sets of users comprises the first set of potential users and the second set of potential users, the selection of the set of users from the plurality of sets of users is based on i) the calculated performance metric for the first set of potential users and ii) the calculated performance metric for the second set of potential users, and selecting the users for the MU-MIMO communication comprises comparing the calculated performance metric for the first set of potential users with the calculated performance metric for the second set of potential users.

14. An apparatus for selecting users for multi user multiple-input multiple-output (MU-MIMO) communication, the apparatus comprising controlling circuitry configured to perform a method comprising:

determining a first channel correlation metric for each user in a first set of potential users;

reducing the first set of potential users by exclusion of a user based on the determined channel correlation metrics, thereby producing a second set of potential users, which is a subset of the first set of potential users; and calculating a performance metric for the second set of potential users; and selecting users for the MU-MIMO communication based on the calculated performance metric for the second set of potential users.

15. The apparatus of claim 14, wherein the method further comprises calculating a performance metric for the first set of potential users, and selecting users for the MU-MIMO communication based on the calculated performance for the second set of potential users comprises selecting users for the MU-MIMO communication based on: i) the calculated performance for the first set of potential users and ii) the calculated performance for the second set of potential users.

16. The apparatus of claim 14, wherein the first channel correlation metric for a user comprises:

a channel filter norm for the user;

a channel norm for the user;

a channel gain for the user;

pair-wise correlations between the user and one or more other users of the first set of potential users; and/or a channel eigenvalue for the user.

17. The apparatus of claim 14, wherein exclusion of a user based on the determined channel correlation metrics comprises:

exclusion of a user associated with the highest channel filter norm among the users in the first set of potential users;

exclusion of a user associated with the lowest channel norm among the users in the first set of potential users;

excluding a user associated with the lowest channel gain among the users in the first set of users;

exclusion of a user associated with the highest pair-wise correlation among the users in the first set of users; and/or exclusion of a user associated with the lowest eigenvalue among the users in the first set of potential users.

18. The apparatus of claim 14, wherein the performance metric for the second set of potential users comprises: a sum-rate, a per-user-rate, an average error rate, a maximum error rate, a per-user error rate, and/or a sum-correlation.

19. The apparatus of claim 14, wherein for the MU-MIMO communication based on: a highest sum-rate, a highest per-user-rate, a lowest average error rate, a lowest maximum error rate, a lowest per-user error rate, and/or a lowest sum-correlation.

20. The apparatus of claim 14, wherein the method is repeated in successive iterations until a stopping criterion is met; and the stopping criterion comprises that a maximum number of iterations have been performed.

* * * * *